United States Patent [19]

Plumb

[11] 4,279,335
[45] Jul. 21, 1981

[54] SAFETY DEVICE HAVING MACHINE DRIVE CAM CONTROL

[76] Inventor: Edwin W. Plumb, c/o Safeguard Manufacturing Company, Pomperaug Ave., Woodbury, Conn. 06798

[21] Appl. No.: 24,709

[22] Filed: Mar. 28, 1979

[51] Int. Cl.³ .............................................. F16P 3/04
[52] U.S. Cl. ...................................... 192/134; 74/613
[58] Field of Search .................. 74/613, 614; 192/130, 192/134

[56] References Cited

U.S. PATENT DOCUMENTS

| | | | |
|---|---|---|---|
| 1,103,437 | 7/1914 | Schade, Jr. | 192/134 |
| 1,212,319 | 1/1917 | Bretsnyder | 192/134 |
| 1,542,708 | 6/1925 | Larson | 192/134 |
| 3,487,182 | 12/1969 | Grundy | 192/134 X |

Primary Examiner—Kenneth Downey
Attorney, Agent, or Firm—Hayes & Reinsmith

[57] ABSTRACT

A hollow clearance indicator is mounted for reciprocable movement toward and away from a fixed machine work area. A movable work-forming element is received in an aperture of the clearance indicator to effect an operation on a workpiece in the machine work area upon actuating a drive output of the machine to drive the movable element into engagement with the workpiece. The clearance indicator is drivingly connected to a safety device which monitors the work area to ensure it is clear of any obstacles, particularly an operator's fingers. The safety device features a rotary cam control drivingly connected between the clearance indicator and a manually-controlled drive input for selectively controlling operation of the drive output in relation to clearance indicator movement.

12 Claims, 6 Drawing Figures

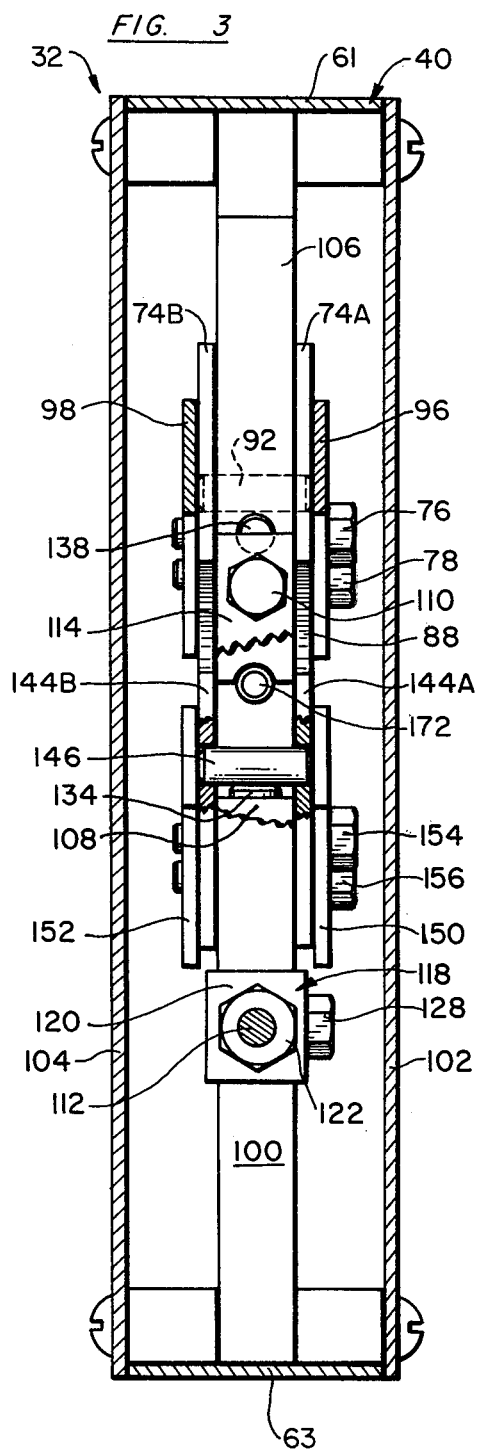
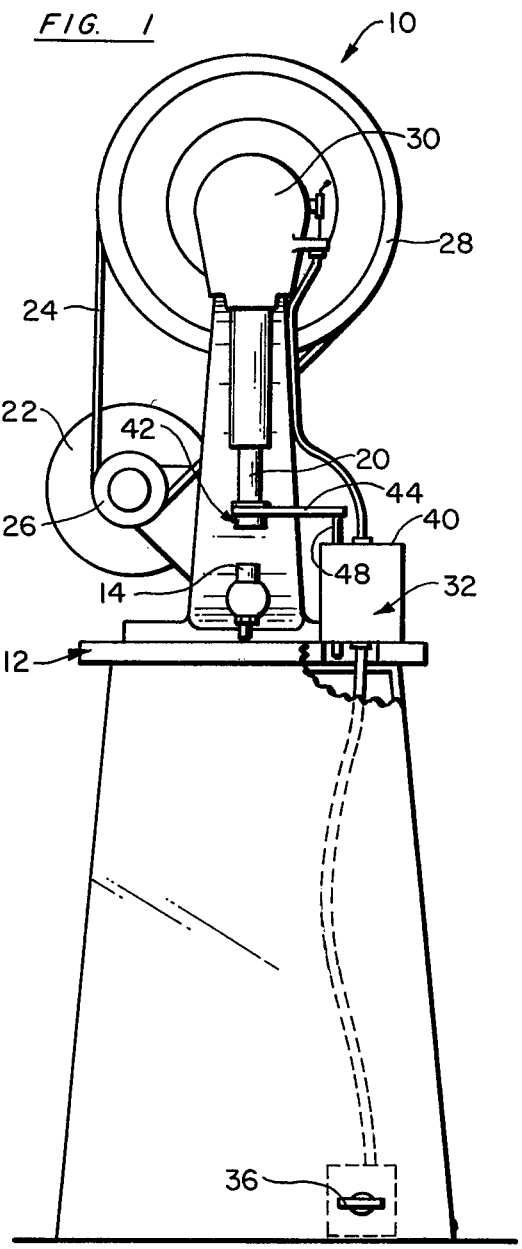

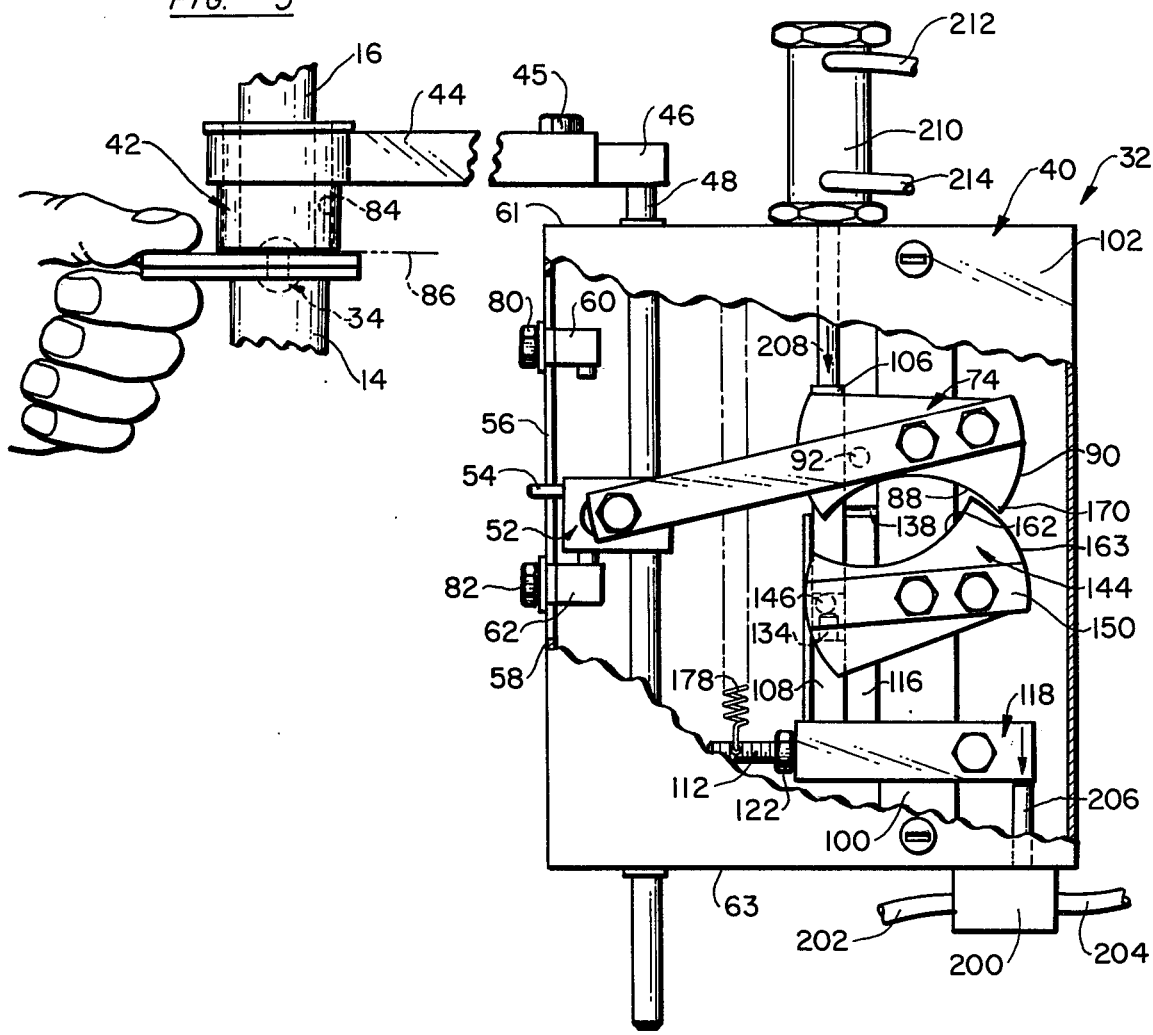

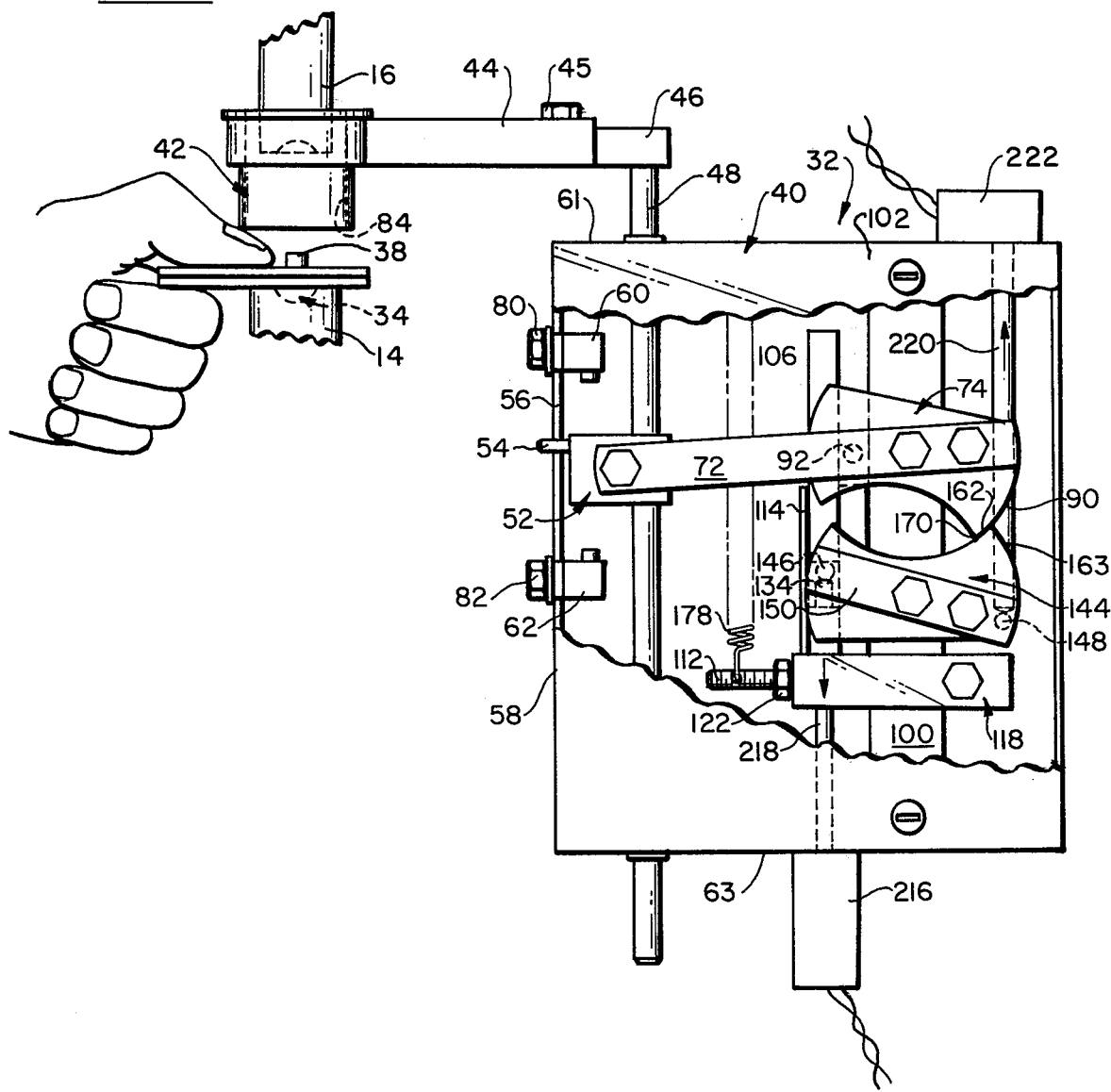

SAFETY DEVICE HAVING MACHINE DRIVE CAM CONTROL

This invention generally relates to safety devices for use with riveters, punch presses and similar power-operated machines and particularly concerns a safety device which monitors the machine work area to preclude injury to an operator.

A principal object of this invention is to provide a new and improved safety device specifically designed to prevent power operation of the machine until a signal is received that the work area is clear of any obstacles.

Another object of this invention is to provide a new and improved device of the type described which is quick and easy to adjust for a variety of different machine work area conditions.

A further object of this invention is to provide such safety device for monitoring a machine work area which utilizes a minimum number of simple, rugged parts in a fool-proof assembly which is quick and easy to economically manufacture for reliable service over an extended period of time under demanding conditions while providing significantly improved safety for the machine operator.

Other objects will be in part obvious and in part pointed out in more detail hereinafter.

A better understanding of the objects, advantages, features, properties and relations of this invention will be obtained from the following detailed description and accompanying drawings which set forth certain illustrative embodiments and are indicative of the various ways in which the principles of this invention are employed.

FIG. 1 is a front view of a machine incorporating a safety device of this invention;

FIG. 3 is a side view, partly broken away and partly in section, of the device of FIG. 2;

FIG. 5 is a view similar to FIG. 4 wherein the safety device is provided with a pneumatic drive input and output and showing the clearance indicator in an operative position; and FIG. 6 is a view similar to FIG. 4 wherein the safety device is provided with an electric drive input and output and showing the clearance indicator in a position intermediate its starting and operative positions.

Figure 2:
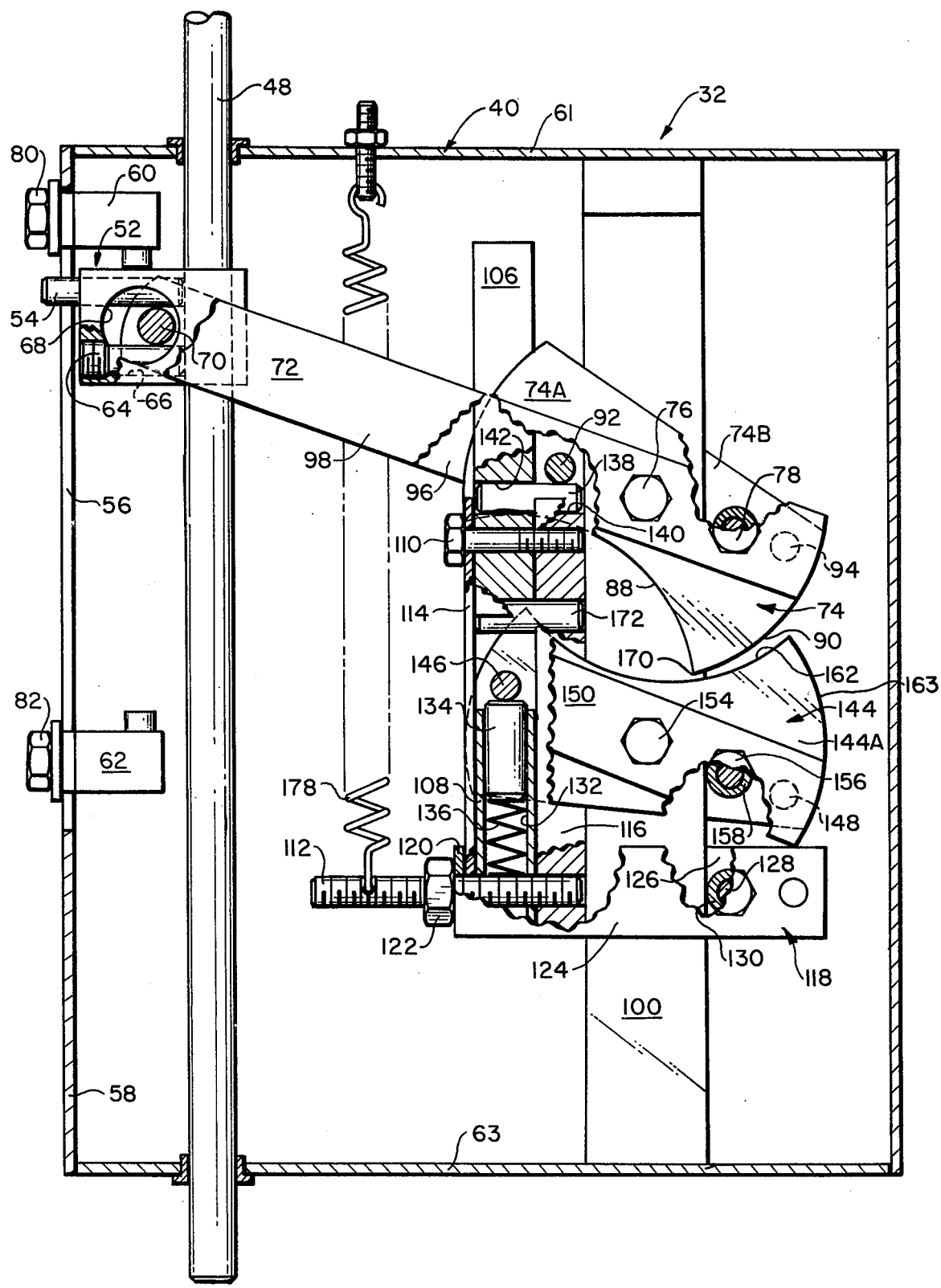
FIG. 2 is an enlarged front view, partly broken away and partly in section illustrating principal operating components incorporated in the safety device of this invention.

Referring to the drawings in detail, machine 10 is shown in FIG. 1 for illustrative purposes only as having a frame 12 with tooling such as fixed die 14 which cooperates with another work-forming element such as movable die 16 (FIGS 4-6) mounted on a reciprocating ram 20 driven from a suitable drive train including a motor 22 for driving a drive belt 24 which is trained over a pulley 26 and flywheel 28 mounted on frame 12. A clutch, not shown, is operatively mounted in a housing 30 to alternately connect and disconnect ram 20 to the drive train to power operate machine 10. With the clutch engaged, suitable controls, not shown, effect reciprocation of the ram 20 in a conventional manner to drive the movable die 16 downwardly into engagement with a workpiece (FIG. 5) and to return die 16 upwardly into its illustrated ready position (FIGS. 1 and 4) to complete a work-forming operation whereupon the clutch is automatically released to condition the machine 10 for the next cycle.

In power drive operated machines such as clamper machines, riveters, punch presses and similar machines with which this invention may be used, workpieces are typically positioned by hand in the work area of the machine 10 for the work-forming operation and thereafter may be manually or automatically removed from the work area to clear it for the next machine operation. Such machines operate at high speed and typically exert a force sufficient to present extreme safety hazards when the machine is energized if an operator, for whatever reason, were to place his hands or fingers within the work area of the machine. While a variety of different approaches have been taken to prevent injury to an operator of machines of this general type, conventional safety devices have not always proven to be tamper-resistent and frequently have been found to be expensive to install and undesirably cumbersome while making the handling of workpieces awkward.

This invention is incorporated in a safety device 32 designed to be quick and easy to install in a simplified rugged construction which permits complete operator visibility of the work area prior to operation of the machine. The safety device 32 is additionally tamper resistant, for the safety device itself controls a drive output and precludes clutch operation to reciprocate ram 20 under all conditions except upon receiving a signal indicative of an obstacle-free condition of the work area. The condition of the work area is automatically determined by the safety device 32 responsive to a manual act by the operator preliminary to automatic machine operation subsequent to the safety device itself determining that the work area is clear but for the workpiece to be formed.

With machine 10 energized to rotate flywheel 28 and a workpiece such as the illustrated rivet 34 properly positioned on fixed die 14, ram operation may be initiated by an operator by pressing a foot pedal 36 (FIG. 1), e.g., to operate the clutch within housing 30 to drive the ram 20 downwardly to cause the movable die 16 to deform a rivet shank 38 (FIGS. 4 and 5) to cold-form the rivet to secure a pair of plates shown for illustrative purposes as being manually held in position on the supporting surface of the fixed die 14. Thereafter, continued machine operation automatically retracts movable die 16 into its uppermost ready position, and the clutch is automatically disengaged in readiness for the next operation.

Safety device 32 is shown having a housing 40 supported on machine frame 12. A hollow clearance indicator 42 is cantilever mounted on a free end of horizontally disposed arm 44 which may be formed as an angle member with appropriate slots or holes, not shown, formed in its upper surface to be secured by a suitable fastener 45 in an infinitely adjustable position relative to an underlying arm 46 fixed on top of an upright operation rod 48. If desired, a similar mounting may be provided for clearance indicator 42 at the lower end of rod 48 as shown in broken lines at 50 in FIG. 4.

Operating rod 48 is secured to a guide 52 having a projecting pin 54 received within a vertical slot 56 in a side plate 58 of housing 40 for movement between upper and lower limit stops 60, 62, the rod being limited to vertical movement by upper and lower plates 61, 63 of housing 40 surrounding upper and lower projecting ends of rod 48. Operating rod guide 52 has a set screw 64 threadedly engaged within opening 66 for securing rod 48 in selectively adjusted fixed relation to guide 52 which has an oversized opening 68 for receiving a crosspin 70 fixed to a swinging end of an actuating lever 72. Actuating lever 72 is secured to a first or upper cam 74 of the safety device 32 by a pair of fasteners 76, 78.

By virtue of the above construction, clearance indicator 42 is quickly and easily oriented with regard to its height as well as its angular relation to operating rod 48 and the work area of machine 10, by adjustment of the rod 48 within guide 52 and then securing the same by screw 64. Fastener 45 is likewise quick and easy to operate to permit extension and retraction of arm 44 and its clearance indicator 42 relative to operating rod 48. Stops 60, 62 have screws 80,82 which upon being released permit adjustment of the stops 60, 62 within the vertical slot 56 in side plate 58 of the safety device housing 40 to selected positions respectively establishing the upper starting position and lowermost operative position of the indicator 42. Once so established, the screws 80, 82 are tightened to draw stops 60, 62 into fixed engagement with side plate 58.

Depending on the tooling of machine 10, the size and central aperture opening 84 of clearance indicator 42 varies. However, the axial path of indicator movement is adjusted so that it is coincident with the axis of movement of the reciprocable ram 20. Indicator aperture 84 is of relatively larger size than the tooling such as die 16, and its work engaging end is always disposed within the confines of indicator 42 regardless of their relative positions. Clearance indicator 42 reciprocates toward and away from the fixed die 14 independently of the movable die 16 which, upon operation of ram 20, is driven downwardly within the clearance indicator aperture 84 in its operative position (FIG. 5). In practice, the preset lowermost position of indicator 42 is such that it is located adjacent the workpiece 34 to be formed with minimum clearance therebetween when that workpiece is in properly aligned position on the fixed work-forming member 14 to effectively prevent an operator's finger from reaching into the work area once indicator 42 assumes its operative position as shown by broken line 86 in FIG. 5.

As best seen in FIGS. 2 and 3, upper cam assembly 74 comprises a pair of cams 74A, 74B respectively having corresponding profiled cam surfaces 88, 90. Cams 74A, 74B are maintained in aligned space relation to one another by crosspins 92, 94 received in holes in cams 74A, 74B between plates 96, 98 of actuating lever 72 overlying cams 74A, 74B. The latter are secured by fastener 76 which cooperates with fastener 78 to maintain the cams in assembly, screw 76 being supported for rotation within an opening in upright 100 secured within housing 40 to its upper and lower plates 61, 63 and centrally disposed within housing 40 between its front and rear walls 102, 104.

Cam drive bar means is provided wherein upper and lower drive blocks 106, 108 are in aligned spaced relation to one another and secured by threaded fasteners 110 and 112 to an interconnecting drive plate 114 and offset parallel drive bar 116. The drive bar 116 is slidably engaged with upright 100 and maintained in engagement therewith by a generally U-shaped connector 118 having a connecting bight 120 secured to drive plate 114 by nut 122 threaded onto fastener 112. Connector legs 124, 126 are disposed on opposite sides of upright 100 and are interconnected by a screw 128 extending through a boss 130 which is slidably engaged with upright 100 on its surface opposite that which engages drive bar 116. The lower drive block 108 has a central opening 132 wherein a plunger 134 is mounted with a compression spring 136 disposed between fastener 112 and plunger 134.

Figure 4:
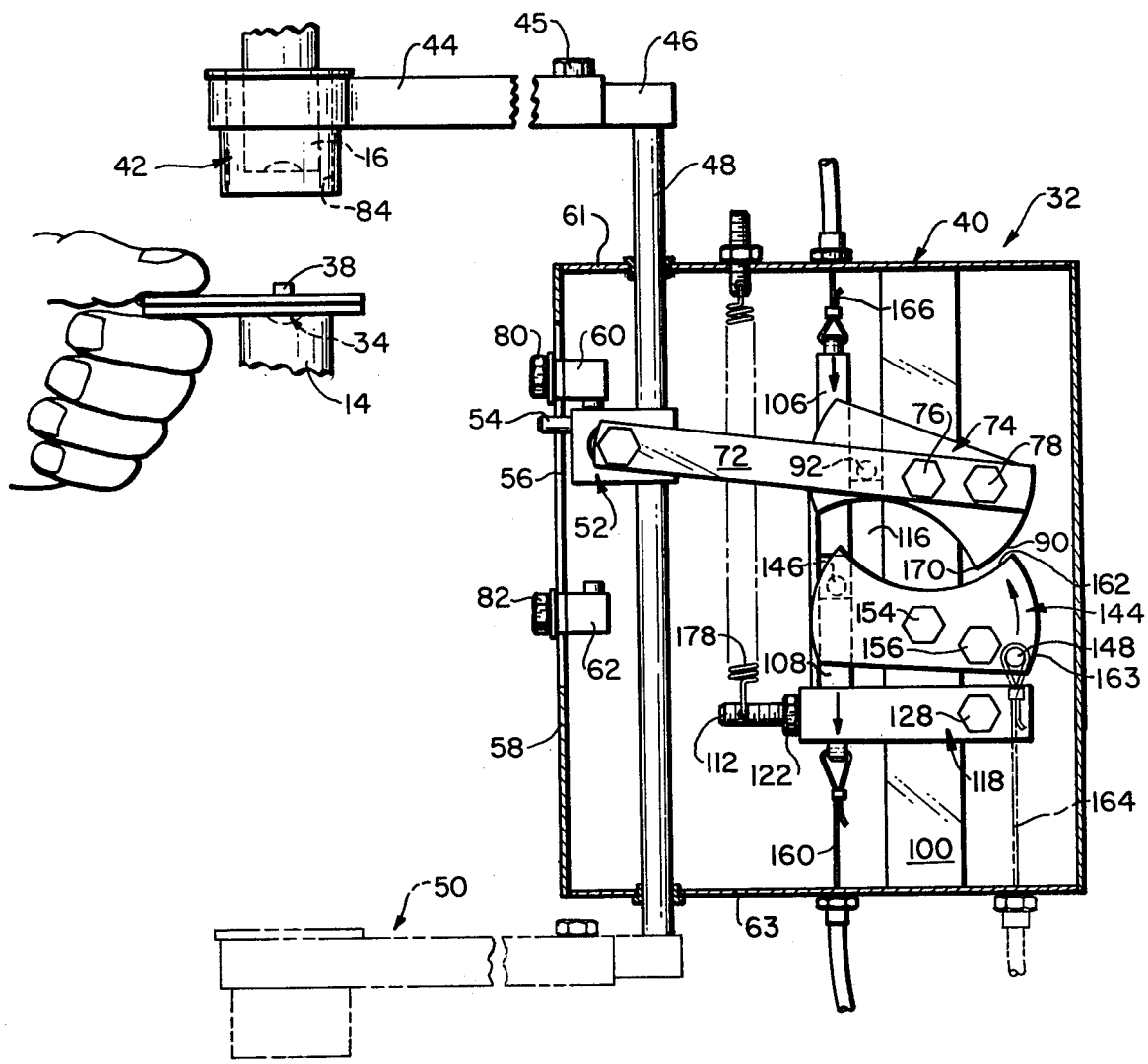
FIG. 4 is a front view of the safety device, partly broken away, showing a mechanical drive input and output with a clearance indicator of the device in starting position.

In the specifically illustrated embodiment as shown in FIGS. 2 and 4, a start position is established for the upper cam assembly 74 in a predetermined angular position by means of its crosspin 92 engaging an underlying pin 138 seated at the top of the drive bar 116 within a half round slot 140 and extending into an opening 142 within upper drive block 106 in captured relation between drive plate 114 and upright 100. With upper cam assembly 74 in start position, a second or lower cam assembly 144 is disposed below convex cam surfaces 90 of cam assembly 74. The lower cam assembly 144 is similar to the upper cam assembly and is comprised of a pair of cams 144A and 144B interconnected in spaced alignment by crosspins 146, 148 captured between overlying plates 150, 152 which are secured by screws 154, 156. Screw 154 is supported for rotation in upright 100 and serves to establish an axis of rotation for lower cam assembly 144.

To establish a start position for the lower cam assembly 144, crosspin 146 is engaged and urged upwardly by plunger 134 in a clockwise direction as viewed in FIG. 2 to an extent limited by engagement of boss 158 (surrounding the shank of screw 156) with the confronting surface of upright 100.

In view of the above construction, it will be seen that a drive connection is established between the clearance indicator 42 and cam assemblies 74, 144 which serve to provide a rotary cam control. In start position of the rotary cam control prior to machine operation, ram 20 is withdrawn in retracted position (FIG. 4) and operating rod guide 52 abuts upper stop 60 with clearance indicator 42 in remote starting position relative to workpiece 34. To initiate ram operation, a cable 160 is shown secured to connector 118 and will be understood to be actuated under manual control of a machine operator via foot pedal 36. Upon operating the foot pedal 36, cable 160 draws the drive bar means downwardly to initially relax spring 136 causing plunger 134 to extend relative to the lower drive block 108 and at the same time, permit upper cam assembly 74 to rotate counterclockwise as viewed in FIG. 4 upon movement of crosspin 92 under the force of gravity in following relation to the underlying downwardly moving pin 138 at the top of drive bar 116 and correspondingly lower the clearance indicator 42 from its uppermost starting position.

Any counterclockwise movement of lower cam assembly 144 is limited by engagement of its concave cam surface 162 with the convex upper cam surface 90, while the upper cam assembly 74 is rotatable to an extent determined by the stroke length of the clearance indicator 42 established by adjustment screws 80, 82 for the upper and lower limit stops 60, 62 in the absence of any obstacle arresting the clearance indicator movement.

In accordance with this invention, a selectively operable drive output is connected to the clutch of the power drive of machine 10 and is actuated only when the lower cam assembly 144 is rotatable past upper cam assembly 74 in its ready position (FIG. 5) with the clearance indicator 42 in operative position 86. Accordingly, the rotary cam control prevents actuation of the drive output to engage the clutch and effect ram operation unless the clearance indicator 42 has determined the work area to be obstacle-free as indicated by full stroke indicator movement into operative position. Such indicator movement obviously is adjustably selected to ensure sufficient rotation of upper cam assembly 74 into ready position such that continued downward movement of the drive bar means will effect rotation of lower cam assembly 144 past upper cam assembly 74 to actuate the clutch.

Should an obstacle be encountered within the work area by the clearance indicator 42, its movement will be arrested (FIG. 6), and rotary movement of the upper cam assembly 74 under the force of gravity will be stopped. When the upper cam rotational movement is interrupted prior to the clearance indicator 42 reaching its operative position, the upper cam convex surface 90 effectively precludes any rotational movement of the lower cam assembly in a clockwise direction to actuate the clutch for ram operation.

More specifically, in FIG. 4 lower cam assembly 144 is shown as having an actuating cable 164 (in broken lines) connected to pin 148 to effect a drive output to the clutch to engage the drive train of machine 10 to effect operation of its ram 20. If so required, the drive output to the clutch may be alternatively provided by cable 166 shown in solid lines fixed to an upper end of drive block 106 such that after an initial movement of the drive bar means relative to the fixed housing 40 is effected to move the upper cam assembly 74 into ready position, continued movement of the bar 106 downwardly will effect clutch actuation upon movement of the lower cam assembly 144 past the cam profile apex 170 of upper cam assembly 74 into clutch actuating position via cable 166 responsive to a force imparted on the lower cam assembly 144 by the input drive cable connection from foot pedal 36.

As previously noted, the operative position of the clearance indicator 42 is readily adjusted by lower limit stop 62 and is preferably established at a point just above workpiece 34 with insufficient clearance to permit an operator's finger to enter the machine work area. Accordingly, once clearance indicator 42 reaches its preset operative position, the rotary cam control permits machine operation upon continued downward movement of the drive bar means to establish a positive drive connection by engagement of crosspin 146 of lower cam assembly 144 with pin 172 shown in FIG. 2 as extending from drive bar 116 into overlying relation to the lower cam crosspin 146 below upper drive bar 106. The positive drive effects sufficient movement of lower cam assembly 144 in a counterclockwise direction to ensure positive actuation of the clutch by the drive output cable connection.

Upon completion of the forming operation on workpiece 34, ram 20 is automatically retracted into start position, the clutch is disengaged and the drive input is deactivated, e.g., by release of the foot pedal to condition the rotary cam control to return from its actuating position (FIG. 5) into start position (FIG. 4). To effect such cam control return, a compression spring 178 is illustrated having its opposite ends secured to the upper plate 61 of the safety device housing 40 and the exposed end of fastener 112 fixed to the connector 118 and lower end of drive bar 116. When the force of the drive input is removed, spring 178 urges connector 118 and associated cam drive bar means upwardly to rotate lower cam assembly 144 clockwise as viewed in FIG. 5 via plunger 134 to pass over apex 170 of the upper cam assembly 74 such that upon continued upward movement of the drive bar means, upper cam assembly 74 is free to effect a following rotary movement in a clockwise direction via the drive connection between pins 138 and 92 to return clearance indicator 42 into starting position (FIG. 4). Spring biased plunger 134 serves to take up lost cam motion during operation of the rotary cam control and additionally serves to assist in returning the lower cam assembly 144 from actuating position to its start position. During such return movement, spring 136 within lower drive block 108 is compressed upon lower cam assembly 144 assuming its start position (FIGS. 2 and 4).

The embodiments of FIGS. 5 and 6 illustrate alternative drive connections to the safety device wherein the same parts are indicated by numbers identical to those previously described in the embodiment of FIG. 4 showing the cable connections to the safety device drive. In FIG. 5, a pneumatic valve 200 is illustrated as being mounted on the lower housing plate 63. Suitable tubing is provided at 202 and 204 to respectively supply air to valve 200 from a suitable supply source, not shown, and provide an air flow outlet which will be understood to be connected to any suitable conventional device, not shown, for power-operating the clutch upon actuation of a valve plunger 206 by connector 118 in response to downward movement of the drive bar means with the rotary cam control in its actuating position after clearance indicator 42 has assumed its operative position 86 as illustrated in FIG. 5. In this embodiment, an extensible and retractable piston rod 208 is mounted for movement within an air cylinder 210 shown secured on housing top plate 61. Cylinder 210 may be of any suitable type such as a conventional double-acting cylinder having reversible air connections at 212 and 214 for reciprocating a piston, not shown, within cylinder 210 in response, e.g., to reversing the air connections 212, 214 upon actuating and releasing the foot pedal 36.

FIG. 6 shows an electric drive arrangement wherein a drive input solenoid 216 is secured to the bottom 63 of housing 40 for power operating a plunger 218 connected to the drive bar means in response to actuation of foot pedal 36, whereby an input drive connection to the drive bar means is alternately actuated and released by manual control of the operator. Once clearance indicator 42 is disposed in operative position to permit the rotary cam control to move into its actuating position, crosspin 148 carried on the lower cam assembly 144 actuates an overlying plunger 220 to operate a clutch control switch 222 on top of housing 40 whereupon the clutch is engaged to effect ram operation. Suitable controls are provided in the drive train to de-activate the clutch upon completion of the forming operation and initiate cam control return for the next cycle.

As best illustrated in FIG. 6, the presence of any obstacle such as an operator's finger in the work area will stop movement of clearance indicator 42 between its starting and operative positions. Despite continued force exerted by the drive bar means, the lower cam assembly 144 is rotatable only from its start position (FIGS. 2 and 4) into a first angular position in engagement with upper cam surface 90 (FIG. 6). The rotary cam control automatically renders the drive output inoperative with surface 90 of the upper cam assembly 74 engaging and blocking movement of lower cam surface 162 in a counterclockwise actuating direction to effectively preclude machine operation. Moreover, it is to be noted that in accordance with the design of this tamper-resistant safety device, clearance indicator 42 cannot be manually pushed upwardly from its operative position at 86 (FIG. 5) toward starting position once lower cam surface 163 rotates past upper cam apex 170 in its ready position toward the actuating position (FIG. 5) of lower cam assembly 144 wherein it is in obstructing relation to return clockwise movement of upper cam surface 88. Accordingly, power operation of machine 10 cannot be interrupted once the clearance indicator 42 has determined that the work area is in an obstacle-free condition.

The described construction of the safety device of this invention provides for a simple, rugged assembly of a minimum number of parts in a tamper-resistant construction which is quickly and easily adjusted for orienting the axis of movement of the clearance indicator between selectively adjustable starting and operative positions relative to the machine work area to effect significantly improved operator safety.

As will be apparent to persons skilled in the art, various modifications, adaptations and variations of the foregoing specific disclosure can be made without departing from the teachings of this invention.

I claim:

1. A safety device particularly suited to preclude operator access to a work area of power drive operated riveters, presses and the like and comprising a clearance indicator for detecting obstacles in a region surrounding the machine work area, the clearance indicator being movable between a starting position in remote relation to the work area and an operative position in adjacent surrounding relation thereto indicative of an obstacle-free condition about the work area, and a machine operating control for effecting machine operation including a manually controlled drive input, a selectively operable drive output connected to the power drive of the machine, and a rotary cam control rotatable by the drive input from a start position into a ready position during movement of the clearance indicator from its starting to operative positions, the drive output being actuated only when the drive input imparts further angular movement to the rotary cam control with the clearance indicator located in operative position to rotate the cam control from its ready position to an actuating position wherein the rotary cam control actuates the drive output to effect machine operation.

2. The device of claim 1 wherein the cam control is rotatable in response to operation of the drive input to drive the clearance indicator between its starting and operative positions, and wherein the cam control automatically renders the drive output inoperative in response to clearance indicator movement being arrested intermediate said starting and operative positions indicative of an obstacle in the region surrounding the work area.

3. The device of claim 1 wherein the machine includes a fixed workpiece forming element and a movable workpiece forming element mounted for reciprocation toward and away from the fixed element upon operation of the power drive, and wherein the clearance indicator has an aperture of relatively larger size than the movable element, the clearance indicator being mounted for reciprocation toward and away from the fixed element independently of the movable element along an axis of movement coincident with that of the movable element of the machine, the movable element being received within the aperture of the clearance indicator in its operative position upon operation of the power drive.

4. The device of claim 1 wherein selectively adjustable means is provided for mounting the clearance indicator on the machine for reciprocation along a selectively adjusted axis of movement between selectively adjusted starting and operative positions relative to the machine work area.

5. The device of claim 1 wherein the rotary cam control is operable in a drive mode in response to the drive input, wherein a spring return is provided for automatically reversing the mode of operation of the rotary cam control upon deactivating the drive input, and wherein operation of the rotary cam control in its reverse mode by the return spring automatically returns the clearance indicator into starting position.

6. The device of claim 1 wherein the rotary cam control prevents return movement of the clearance indicator from operative position to its starting position when the cam control is between its ready and actuating positions to prevent interruption of power operation of the machine with the work area in an obstacle-free condition.

7. A safety device particularly suited to preclude operator access to a work area of power drive operated riveters, presses and the like and comprising a clearance indicator for detecting obstacles in a region surrounding the machine work area, the clearance indicator being movable between a starting position in remote relation to the work area and an operative position in adjacent surrounding relation thereto indicative of an obstacle-free condition about the work area, and a machine operating control for effecting machine operation including a manually controlled drive input, a selectively operable drive output connected to the power drive of the machine, first and second cams supported on the machine for independent rotation about spaced parallel axes, the first cam being rotatable in response to the drive input from a start position to a ready position, a drive connection between the first cam and the clearance indicator for moving the indicator from its starting to operative positions in response to rotation of the first cam from start position to its ready position, the second cam being engageable in a first angular position thereof with the first cam during movement of the first cam between its start position and its ready position, and actuating means for actuating the drive output and power operating the machine in response to a machine starter cam movement imparted by the drive input to rotate the second cam from its first angular position to an actuating position, the first cam being in obstructing relation to said machine starter movement of the second cam when the first cam is between its start and ready positions to prevent machine operation until the clearance indicator establishes an obstacle-free condition about the work area as indicated by movement of the indicator into its operative position.

8. The device of claim 7 wherein the drive input effects rotation of the second cam from its first angular position to its actuating position when the first cam moves into its ready position with the clearance indicator disposed in its operative position.

9. The device of claim 7 wherein the drive input includes linearly reciprocable drive bar means, and wherein the first cam includes a pin extending therefrom generally parallel to its axis of rotation in overlying relation to the drive bar means for following engagement therewith, whereby downward movement of the drive bar means effects a following movement by the first cam for rotating the first cam from start position to its ready position under the force of gravity.

10. The device of claim 9 wherein termination of first cam rotation between its start and ready positions is indicative of an obstacle in the region surrounding the work area detected by and arresting the movement of the clearance indicator.

11. The device of claim 9 wherein the second cam includes a pin extending therefrom generally parallel to its axis of rotation, the drive bar means including an opening therein defining a drive surface overlying the pin of the second cam in spaced relation thereto and a spring biased second drive surface in underlying engagement with the pin of the second cam urging the pin toward the overlying first drive surface, and the first drive surface of the drive bar means effecting a positive drive to rotate the second cam from its first angular position into its actuating position upon continued downward movement of the drive bar means with the first cam in its ready position.

12. The device of claim 11 wherein the second drive surface is provided by a head of a spring biased plunger mounted in the drive bar means, the plunger being resiliently urged upwardly against the pin of the second cam and serving to assist in its return from its actuating position to its first angular position upon deactivating the drive input and returning the drive bar means in an upward direction.

* * * * *